(12) United States Patent
Martin

(10) Patent No.: US 7,828,496 B1
(45) Date of Patent: Nov. 9, 2010

(54) WATERTIGHT JOINT SEAL FOR CONCRETE STRUCTURES

(75) Inventor: Everett Nelson Martin, Terre Hill, PA (US)

(73) Assignee: Terre Hill Silo Co., Inc, Terre Hill, PA (US)

( * ) Notice: Subject to any disclaimer, the term of this patent is extended or adjusted under 35 U.S.C. 154(b) by 281 days.

(21) Appl. No.: 12/150,722

(22) Filed: Apr. 30, 2008

(51) Int. Cl.
*F16L 17/06* (2006.01)
*F16L 21/02* (2006.01)

(52) U.S. Cl. .................. 405/135; 405/152; 277/608; 277/616

(58) Field of Classification Search .............. 405/134, 405/135, 132, 149, 150.1, 151, 152, 153; 277/590, 602, 608, 616
See application file for complete search history.

(56) References Cited

U.S. PATENT DOCUMENTS

| | | | |
|---|---|---|---|
| 4,582,453 A | 4/1986 | Ressi di Cervia | |
| 5,030,033 A | 7/1991 | Heintzelman | |
| 5,096,206 A | 3/1992 | Andre et al. | |
| 5,346,332 A | * | 9/1994 | Wagner et al. ............... 405/153 |
| 5,899,635 A | * | 5/1999 | Kuja et al. .................. 405/136 |

* cited by examiner

Primary Examiner—Tara Mayo-Pinnock
(74) Attorney, Agent, or Firm—Martin Fruitman

(57) ABSTRACT

The invention is a watertight joint seal for precast concrete box modules used to form underground enclosures to control the discharge of water runoff from roads and parking areas. The modules become sections of a tunnel structure, and the joint seal of the invention is constructed by forming the end of the walls of each module with mating offset inside and outside edge surfaces that are joined by an intermediate surface, applying sealing strips to the inside and outside edge surfaces of one end wall, compressing the modules against each other, and injecting an expansive grout into the cavity formed by the sealing strips and the modules' end surfaces. After the grout cures under the pressure resulting from its own expansion, the joint is watertight and does not suffer from leakage through cracks caused by the creep and relaxation characteristics which generally occur in joints formed with conventional grout or only rubber gaskets.

8 Claims, 2 Drawing Sheets

WATERTIGHT JOINT SEAL FOR CONCRETE STRUCTURES

BACKGROUND OF THE INVENTION

This invention deals generally with joint seals for concrete structures and more particularly with seals between precast concrete box modules used to form underground enclosures to store water.

The law in most jurisdictions requires control of the rate of discharge and the volume of storm water run-off from certain sites, but traffic safety requirements conflict with such controlled rates of discharge because they require accelerated surface drainage of storm water. A favorable solution to these conflicting requirements is an on-site underground storage structure used for retention or detention of storm water. Such a structure provides temporary storage of the storm water and controls its release from the structure at a predetermined rate dictated by the legal requirements or site conditions.

However, in addition to the control of rate of discharge, certain sites are not at all suitable for infiltration and recharge of the groundwater table. Some soil conditions are susceptible to sinkhole formation, and substrate pollution conditions may prohibit infiltration and require long term watertight water storage. Other site conditions may also require a watertight structure.

Precast box structures forming a horizontal tunnel structure from segments constructed off-site and assembled at the project site can be used for both short and long term storage. However, the watertight joints required in such a configuration are a challenge for the installer to make watertight. Post-tensioning the segments and squeezing rubber strips between adjacent concrete segments of the joints does not satisfy the goals of water tightness because of imperfections in the precast joint surface and the rubber strips. Furthermore, the inherent creep and relaxation properties of the joint rubber or other sealants used undermine the long-term water tightness. The change in dimensions from such creep and relaxation causes cracks and leaks at the joint.

It would be very beneficial to have available a transitional joint that provides short and long term stability for a watertight seal between precast concrete modules used underground.

SUMMARY OF THE INVENTION

The joint seal of the present invention provides installation flexibility and long term watertight joints for an assembly of concrete box-like modules by utilizing high strength precast concrete, post-tensioning technology, flexible joint sealing strips, and expansive grout injection into the joint through internal ducts which are formed during the initial casting of the modules. A typical prior art seal that is provided by only a rubber seal and post-tensioning weakens with time and leaks due to imperfections in the casting and the rubber seal. However, with the present invention the joint transitions to long-term stability because of the injection of non-shrink grout, which when cured supports the pre-stress loading that otherwise would be lost if the seal were dependent on the rubber joint seal alone.

The joint is constructed by forming the mating ends of the walls of each tunnel-like module with offset interior and exterior edge surfaces that are joined by an intermediate surface. In the preferred embodiment the cross section of the joint resembles a stair step with oppositely directed vertical risers attached between the step surface and the interior and exterior edge surfaces. On the end face of one wall, continuous closed cell neoprene sealing strips are bonded to each of the interior and exterior edge surfaces. The modules are then aligned and compressed against each other by tightening the post tensioning cables that pass through ducts running the length of each module. Such a compression system is common and referred to in the industry as "post tensioning". After the modules are assembled and post tensioned together, a non-shrink, expanding, cementitious grout is injected into the joint. In the preferred embodiment of the invention, the injection is performed through passages that run from the outside surface of the module into the cavity formed between the two modules and the sealing strips at the edges, however, the input for the passages can be located on any surface that is accessible after the joint is assembled. These injection passages are formed when the module is originally constructed. After the grout cures under the pressure resulting from its own expansion, the joint's long term water tightness is secured because the characteristics of the grout do not suffer from the creep and relaxation that cause the cracks which generally occur in joints formed with conventional grout or only rubber gaskets.

The post tensioning cables squeeze the aligned sections together, and the cables are anchored at the end sections of the modules. The joint spacing is thus reduced to a dimension determined by the cable tension and the compression of the sealing strips. The compression stress of 10 psi is defined in ASTM standard C990, section 10. The subsequent grout injection takes advantage of the temporary seal formed by the prestressed joint and the sealing strips by injecting the expanding grout into the cavity formed between the compressed sealing strips and the concrete module end surfaces.

The joint grout consists of a water, cement, and expansive agent mixture. The grout is injected through one injection passage that reaches the joint cavity while a second passage provides release of air and water from the joint cavity. Saturation of the cavity with grout is indicated when the grout flows out of the second passage. At this point, the passage openings are sealed. The expansive grout cures and provides a long term watertight joint which was cured under pressure and will not suffer the creep and relaxation characteristics that cause leaks in prior art structures to this type.

DETAILED DESCRIPTION OF THE INVENTION

Figure 1:
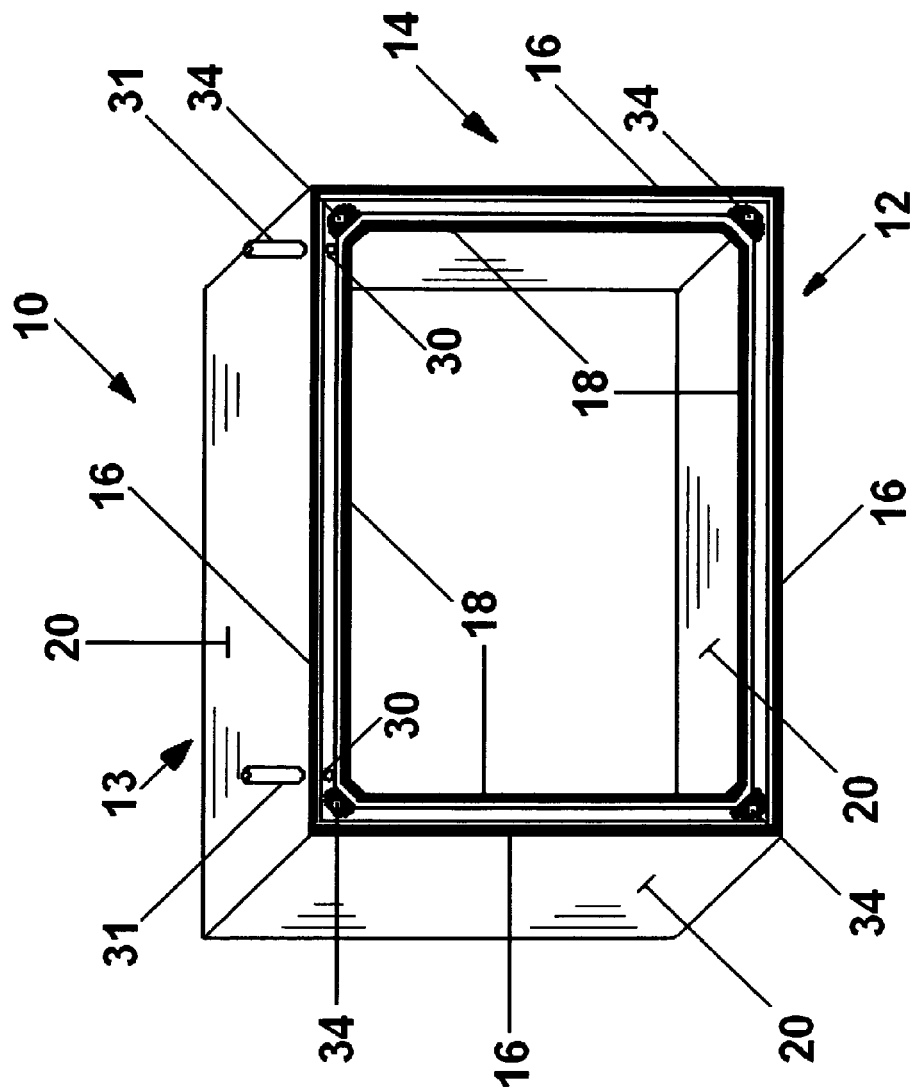
FIG. 1 is a perspective view of one precast concrete water storage module viewed from an end which includes the components of the preferred embodiment of the joint seal of the invention.
Figure 2:
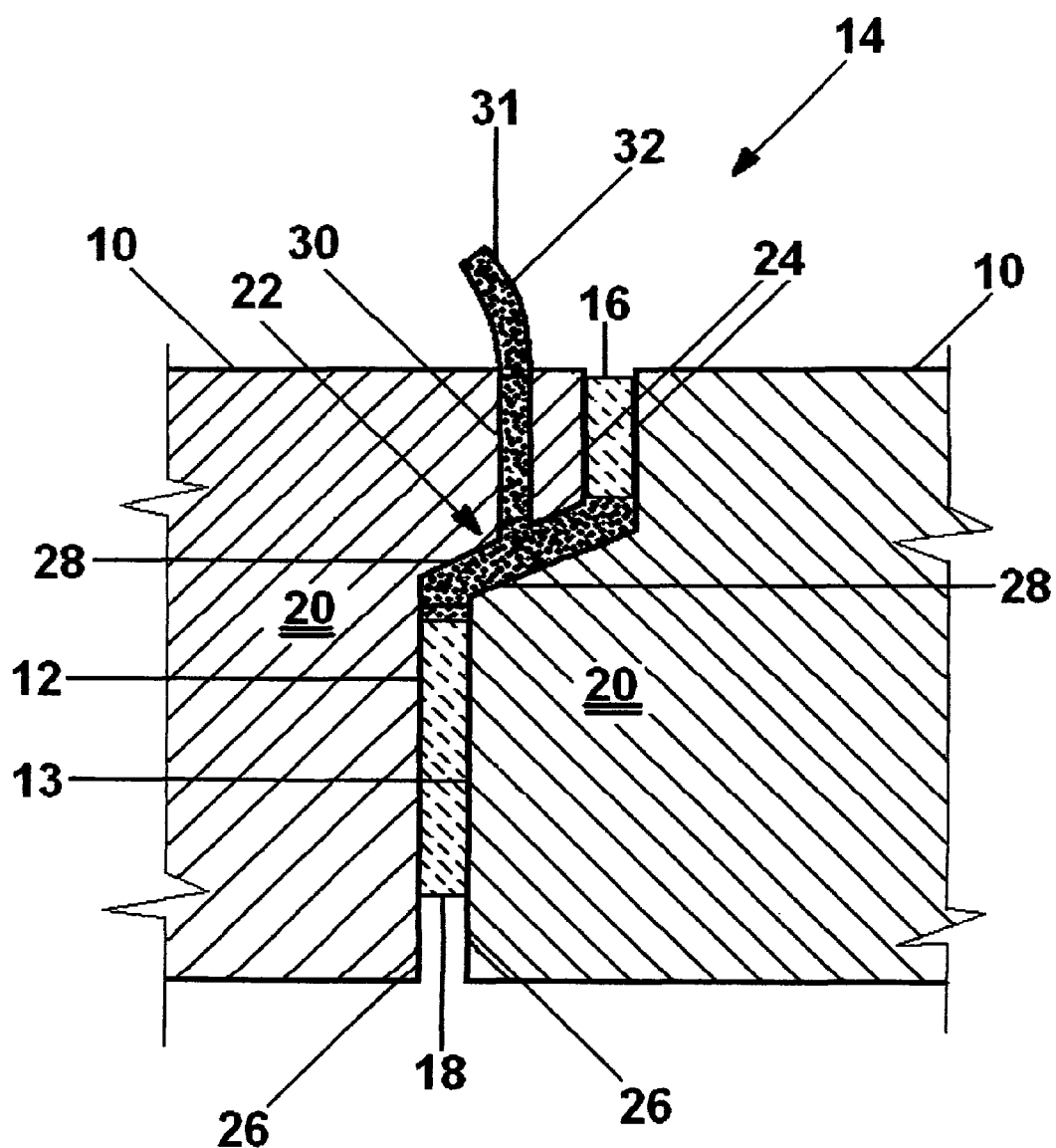
FIG. 2 is a cross section view of the preferred embodiment of the joint seal of the invention shown installed between the ends of the walls of two precast concrete modules.

FIG. 1 is a perspective view of precast concrete water storage module 10 viewed from end 12 where the components of the preferred embodiment of joint seal 14 of the invention are installed, and FIG. 2 is a cross section view of the preferred embodiment of joint seal 14 shown installed between the ends 12 and 13 of walls 20 of two precast concrete modules 10.

Module 10 can be used alone for the storage or discharge of smaller amounts of water, but it is typically part of an assembly of modules 10 that form a structure similar to a tunnel to handle larger quantities of water. In such applications, modules 10 are joined together by watertight seal 14, and both ends of the assembly, regardless of length, are closed off by the use of the same watertight seal structure installed on a closed end wall.

The details of the preferred embodiment of joint seal 14 of the invention are best shown in FIG. 2, while FIG. 1 provides a better appreciation of the location of the components of joint seal 14 as they are installed on module 10.

Since only one side of the joint requires the installation of sealing strips 16 and 18, for efficiency of production the sealing strips are usually installed on only one end 12 of each module 10, and the other end 13 of each module has no sealing strips. However, sealing strips on only one end of each module is not a requirement of the invention as long as each joint 14 has sealing strips that are attached to one module and the adjacent module has a surface that compresses the sealing strips. As shown in FIGS. 1 and 2, sealing strip 16 follows along the exterior edge surfaces of the end of each wall 20 of module 10, and sealing strip 18 follows along the interior edge surfaces of the end of each wall 20 of module 10. In the preferred embodiment, sealing strips 16 and 18 are continuous, constructed of closed cell neoprene, and adhered to the concrete at exterior edge surfaces 24 and interior edge surfaces 26.

As best seen in FIG. 2, the structures of ends 12 and 13 of mating walls 20 are shaped to create cavity 22. Cavity 22 is enclosed by sealing strips 16 and 18, exterior matching offset and interior edge surfaces 24 and 26, and intermediate surfaces 28 by which exterior edge surfaces 24 and interior edge surfaces 26 are joined.

Assembly of joint 14 comprises the following steps.
1) Shaping the end surfaces of walls 20 at the mating ends of each module to include exterior edge surfaces 24 and interior edge surfaces 26 offset from each other and connected by intermediate surfaces 28;
2) Bonding sealing strips 18 and 16 to interior edge surfaces 26 and exterior edge surfaces 24 of at least one module with adhesive;
3) Aligning and compressing the mating ends of the modules against each other with sealing strips 16 and 18 between the modules; Post tensioning cables are used to squeeze the aligned sections together. The modules are compressed against each other by tightening cables (not shown) that pass through ducts 34 running the length of each module, and the cables are anchored at the end sections of the modules.
4) Injecting non-shrink, expansive, cementitious grout 32 into a first access tube 31 and through grout passage 30 into cavity 22 formed between the sealing strips and the modules' end surfaces 12 and 13 until all air is released through a second access tube 31 and a steady stream of grout flows out through second access tube 31; and
5) Closing off both access tubes 31 to prevent the expanding grout from leaking out during the curing process.

The closing of the access tubes can be accomplished by several means including using corks or simply bending the access tubes over and strapping the fold closed. After curing of the grout, which causes hardening into a long term seal, the access tubes with their hardened grout may be cut off with no adverse effect on the seal between the modules.

The grout used in the present invention is a mixture of 1 cubic foot of Portland cement, 5 gallons of water, and Sika Corporation's, INTERPLAST-N "Expanding/Fluidifying Grouting Aid" in the quantity recommended by the manufacturer to produce a volumetric expansion of at least 10% in the grout. The grout proportions may be altered to produce varying characteristics. For example, more water is used to produce lower viscosity, less water to produce higher strength, and more expansive agent to yield greater expansion.

In the preferred embodiment, grout 32 is injected through passages 30 that extend from the outside surface of the module into cavity 22 formed between the two modules. Injection passages 30 are formed when the module is originally constructed and function well when they terminate near corners at which the cavity changes direction where two walls of a module meet.

In the first several weeks after installation, as grout 32 cures, it takes over the function of stress relief from the sealing strips. After grout 32 cures, the joint is watertight and, because of the characteristics of the grout, it does not suffer from the creep and relaxation characteristics which generally occur in joints formed with conventional grout with rubber gaskets or rubber gaskets alone.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims. For example the shape of the structures being joined is immaterial, and structures with either linear or curved walls can be joined by the watertight seal of the invention. Furthermore, after the modules are assembled, ducts 34 through which the post tensioning cables run are also typically filled with a protective grout.

What is claimed as new and for which Letters Patent of the United States are desired to be secured is:

1. A method of constructing a watertight joint seal between mating concrete structures with walls which have end surfaces, the method comprising:
    shaping the end surfaces of the walls at the mating ends of each module to include interior edge surfaces and exterior edge surfaces offset from each other in different planes and connected by intermediate surfaces;
    bonding sealing strips to the interior edge surfaces and exterior edge surfaces of at least one module;
    aligning and compressing the mating ends of the modules against each other to hold the interior edge surfaces and the exterior edge surfaces of the modules together with the sealing strips between the modules; and
    with the modules compressed together, injecting expansive, cementitious grout to fill a cavity formed by the intermediate surfaces between the sealing strips and the modules' end surfaces.

2. The method of claim 1 further including forming within at least one module at least one grout injection passage that extends from a surface accessible after the modules are compressed together and terminates at the cavity formed between the modules.

3. A watertight joint seal between mating modular concrete structures with walls which have end surfaces, the joint seal comprising:
    end surfaces of the walls at the mating ends of each module including interior edge surfaces and exterior edge surfaces offset from each other in different planes and connected by intermediate surfaces;
    sealing strips bonded to the interior edge surfaces and exterior edge surfaces of at least one module;
    the mating ends of the modules aligned and compressed against each other with the sealing strips between the modules; and
    expansive, cementitious grout within a cavity formed by the intermediate surfaces between the sealing strips and the modules' end surfaces.

4. The joint seal of claim 3 further including at least one grout injection passage that extends from a surface accessible after the modules are compressed together and into the cavity formed between the modules.

5. The joint seal of claim 4 wherein at least one grout injection passage has an opening on an exterior surface of a module and terminates in the cavity formed between modules.

6. The joint seal of claim 4 wherein at least one grout injection passage terminates in the cavity formed between modules at a location within the cavity adjacent to a location at which adjacent walls of modules meet.

7. The joint seal of claim 3 wherein the sealing strips are continuous and constructed of closed cell neoprene.

8. The joint seal of claim 3 installed in an assembly in which one module is a closed end wall.

* * * * *